United States Patent
Lee et al.

(10) Patent No.: US 7,403,543 B2
(45) Date of Patent: Jul. 22, 2008

(54) TCP/IP HEADER COMPRESSION FORMAT AND METHOD OVER WIRELESS NETWORK

(75) Inventors: Chih-Hsin Lee, ChinMen Hsien (TW); Meng-Ju Lin, SaLu Chen (TW)

(73) Assignee: Qisda Corporation, Taoyuan (TW)

( * ) Notice: Subject to any disclaimer, the term of this patent is extended or adjusted under 35 U.S.C. 154(b) by 795 days.

(21) Appl. No.: 10/843,325

(22) Filed: May 12, 2004

(65) Prior Publication Data

US 2004/0252671 A1    Dec. 16, 2004

(30) Foreign Application Priority Data

May 13, 2003    (TW) ............................... 92112871 A

(51) Int. Cl.
*H04J 3/18*    (2006.01)
*H04Q 7/00*    (2006.01)

(52) U.S. Cl. .................. 370/477; 370/252; 370/329

(58) Field of Classification Search .............. 370/229, 370/466, 467, 328, 329, 252, 349, 477; 709/238, 709/230, 247; 714/748, 749; 455/445

See application file for complete search history.

(56) References Cited

U.S. PATENT DOCUMENTS

| 6,882,637 | B1 * | 4/2005 | Le et al. ...................... 370/349 |
| 6,898,640 | B1 * | 5/2005 | Kurita et al. ................. 709/238 |
| 2001/0036154 | A1 * | 11/2001 | Takagi ......................... 370/229 |
| 2004/0192312 | A1 * | 9/2004 | Li et al. ....................... 455/445 |

* cited by examiner

*Primary Examiner*—John Pezzlo
(74) *Attorney, Agent, or Firm*—WPAT., P.C.; Justin King

(57) ABSTRACT

The present invention provides a TCP/IP header compression format as a label in package transmitting. The header format is used under the acknowledgement mode in wireless network to reduce the header transmission amount between the base station and the mobile station, comprising: a connecting sequence number field for storing a connecting sequence number to indicate the required TCP/IP header information related base stations; a buffer length field for storing a length value of the buffer region to indicate the acceptable package number of the buffer region in receiver; and a plurality of control flag fields for providing certain necessary information for transmission control.

14 Claims, 5 Drawing Sheets

31: last flag field
32: urgeut flag field
33: acknowledgment flag field
34: push flag field
35: reset the connection flag field
36: synchronous flag field
37: finish flag field
38: reserved field IP package type A: Indicate flag field
B: DF-Don't Fragment flag field
C: MF-More Fragment flag field TCP package type D: URG-urgent flag field
E: ACK-acknowledgment flag fied
F: PSH-push flag field
G: RST-reset the conuection flag field
H: SYN-synchronous flag field
I: FIN-finish flag field 31: last flag field
32: urgeut flag field
33: acknowledgment flag field
34: push flag field
35: reset the connection flag field
36: synchronous flag field
37: finish flag field
38: reserved field

TCP/IP HEADER COMPRESSION FORMAT AND METHOD OVER WIRELESS NETWORK

FIELD OF THE INVENTION

The present invention relates to a Transmission Control Protocol/Internet Protocol (TCP/IP) header compression format and method, in particular to a TCP/IP header compression format and method used under the connection mode in wireless network to reduce the header transmission amount between the base station and the mobile station.

BACKGROUND OF THE INVENTION

In recent years, with the great progress of mobile telecommunication, digital mobile products of all kinds, such as mobile phone, laptop, PDA and so on have been the important part of human daily life. Therefore, the requirements of the wireless Internet such as receiving/sending e-mail immediately and obtaining real-time information are increasing vastly. And how to connect the wireless telecommunication with the Internet thereof becomes an important research topic in nowadays. Please refer to FIG. 1, which is a schematic diagram showing the wireless Internet scheme. To get resources in the Internet, the user needs a point-to-point link to download and upload information. In fact, from the viewpoint of the wireless Internet, a point-to-point link can be divided into two parts: the wireless telecommunication from the mobile unit to the base station, and the network communication from the base station to the Internet. Wherein, in the part of the wireless telecommunication, the data will be transmitted from the mobile product to the base station and received from the base station via wireless. It's a direct point-to-point connection. However, in the part of the line network connection, the data are transmitted to the Internet via the present framework such as telephone network and optical fiber communication, and then sent to the remote terminals such as server, personal computer, work station and so on. The network connection needs more network control information for each of the connections.

In fact, the most common point-to-point transmission protocol in the Internet is the Transmission Control Protocol/Internet Protocol (TCP/IP), which is built in the traditional point-to-point transmission protocol of network connection. For its excellent reliability as well as robustness and the growth of Word Wide Web (WWW), the TCP/IP has been utilized extensively in the Internet now.

In the traditional network connection, if the transmitted data are larger, they will be divided into several smaller portions to avoid occupying too much frequency bandwidth in each transmitting, and then transmitted successively in the packet format; finally, all the packets will be received and combined by the remote receiver. However, because the networks are extended in all directions and the network statuses are instantaneously varying, the paths of packets may be different, and thus the received sequence may be different from the original transmitting sequence. Therefore, to avoid confusing the packet sequence and to recombine all the packets correctly, we need to define certain labels on such packets, which are so-called "header". Please refer to FIG. 2, which shows the header format in typical TCP/IP packet of the prior art. The TCP/IP header can be divided into two pans: the Transmission Control Protocol (TCP) header and the Internet Protocol (IP) header.

The IP header comprises a Version field, which has 4 bits to label the using version of the TCP/IP; an Internet Header Length (IHL) field with 4 bits for specifying the length of the IP header; a Type of Service field with 8 bits, which relates to the quality service types such as the minimum delay, the maximum throughput, the maximum reliability, and the minimum cost; a Total Length field with 16 bits for indicating the total bits of the package; an Identification field with 16 bits, which gives each package an unique serial number for conveniently recombining the packages from the receiver. Next, the filed provides a 3 bits information flag set, an Indicate flag with 1 bit, a Don't Fragment (DF) flag with 1 bit, and a More Fragment (MF) flag with 1 bit. Wherein the indicate flag, shown as symbol A in FIG. 2, is used to indicate whether the information flag set is triggered; the DF flag, shown as symbol B in FIG. 2, is used to indicate whether the package may be fragmented, and the MF flag, shown as symbol C in FIG. 2, is used to indicate whether the package is the last one. And then, the next field is a Fragment Offset field with 13 bits for indicating the fragment address corresponded to the original location in the data beginning. The IP header also comprises a Time to Live field with 8 bits, which is used to indicate the maximum time the package is allowed to remain in the Internet system; a Protocol field with 8 bits for indicating the Internet protocol type the package is using; a Header Checksum field with 16 bits for detecting whether the package is transmitted correctly; a Source Address field with 32 bits for storing the address of the transmitting terminal; and a Destination Address field with 32 bits for storing the address of the receiver. In summary, the total length of the IP header is 20 bytes.

The TCP header comprises a Source Port field with 16 bits for indicating the working port of the transmitting terminal; a Destination Port field with 16 bits for indicating the working port of the receiver; a Sequence Number field with 32 bits, which corresponds to the sequence number of the package; an Acknowledgment Number field with 32 bits for indicating the sequence number of the package that has been received; a TCP Header Length field with 4 bits for specifying the figure of the TCP header length; a Reserved field with 6 bits, which is not used yet. Next the reserved field are 6 control bits, including an Urgent Flag field (URG), shown as symbol D in FIG. 2, with 1 bit for indicating whether the package carries the urgent data; an Acknowledgment Flag field (ACK), shown as symbol E in FIG. 2, with 1 bit for indicating whether the package asks the response form the receiver; a Push Flag field (PSH), shown as symbol F in FIG. 2, with 1 bit for indicating whether the package pushes the receiver to send the data to the application program; a Reset the Connection Flag field (RST), shown as symbol G in FIG. 2, with 1 bit for indicating whether the data needs to be resent; a Synchronous Flag field (SYN), shown as symbol H in FIG. 2, with 1 bit for indicating whether the synchronization needs to be carried out; a Finish Flag field (FIN), shown as symbol I in FIG. 2, with 1 bit for indicating whether the transmission is over. After these control bits is a Buffer Length field with 16 bits, which is used to indicate how much free space is remained so as to avoid the error of Overflow. The TCP header also has a Checksum field with 16 bits for detecting whether the package is transmitted correctly and an Urgent Pointer field with 16 bits for storing the urgent data when the URG control bit is set. In summary, the total TCP header is of 20 bytes. And basically, the length of TCP header is a multiple of word.

From the foregoing, the total length of general TCP/IP header is 40 bytes. That is, each packet needs to increase the transmission amount of 40 bytes, which is very bulky and wasted, and thereby several new header compression formats are continually brought out to solve such problems. In the traditional network connection, the most common header compression method is Van Jacobson TCP/IP header compression, so-called RFC 1144 compression. RFC 1144 can efficiently compress the header format by eliminating some unvaried fields such as the Version field, the Destination Address field, and the Destination Port field during the lifetime.

In the wireless communication, RFC 1144 is also the most familiar method to compress the headers at the present day. However, it is designed to aim at the traditional network connection structure, not at the wireless telecommunication, so this method does not consider the limitation of the wireless transmission such as the narrower bandwidth. In fact, the major bottleneck of the wireless Internet is the part of the wireless communication, so how to increase the efficiency of the data transmission has become a very important topic now. In the wireless communication, each unnecessary data transmitting will reduce the substantial transmission rate; therefore, if we can utilize some characters of wireless telecommunication to carry out the further data compression, the data transmission rate will be improved largely.

SUMMARY OF THE INVENTION

The primary object of the present invention is to provide a Transmission Control Protocol/Internet Protocol (TCP/IP) header compression method for wireless point-to-point connection.

Another object of the present invention is to provide a TCP/IP header compression format eliminating the unnecessary transmission to increase the substantial transmission amount.

To achieve the aforesaid objects, the present invention provides a TCP/IP header compression format as a label in package transmitting. The header format is used under the acknowledgement mode in wireless network to reduce the header transmission amount between the base station and the mobile station, comprising:
a connecting sequence number field for storing a connecting sequence number to indicate the required TCP/IP header information related base stations;
a buffer length field for storing a length value of the buffer region to indicate the acceptable package number of the buffer region in receiver; and
a plurality of control flag fields for providing certain necessary information for transmission control.

DETAILED DESCRIPTION OF THE INVENTION

Matched with corresponding drawings, the preferable embodiments of the invention are presented as following and hope they will benefit your esteemed reviewing committee members in reviewing this patent application favorably.

The spirit of the present invention is to reduce the used bytes of TCP/IP header. Besides the traditional method of RFC 1144, the present invention also makes use of the characters in wireless telecommunication. The most difference between wireless telecommunication and line telecommunication is that wireless telecommunication belongs to the single-hop connection, in which the data will be sent from the transmitting terminal to the receiver directly. However, the line telecommunication belongs to the multi-hop connection, in which the data will select the fast path when transmitting; but the network status is variable, and thereby the different packages divided from the same datum will go through the different paths, arriving to the receiver successively. That is, in the wireless communication, the mobile phone is directly connected to the base station with the single-hop connection, rather than through the different paths as of the line telecommunication causing the receiving sequence to be different from the transmitting sequence. What needs to emphasize is that the meaning of the mentioned "multi-hop" is different from the meaning of "multi-path effect" of the wireless telecommunication; the "multi-hop connection" means that different packages will be sent to the receiver through different paths, however, the "multi-path effect" means that the same package is received for several times due to the interference of the refraction and reflection generated by the certain topography when transmitting. Besides, the other important essence of the present invention is that some required data in TCP/IP header can be also found in the wireless telecommunication protocol, which results in some reiteration data that can be eliminated and without transmitted.

Figure 1:
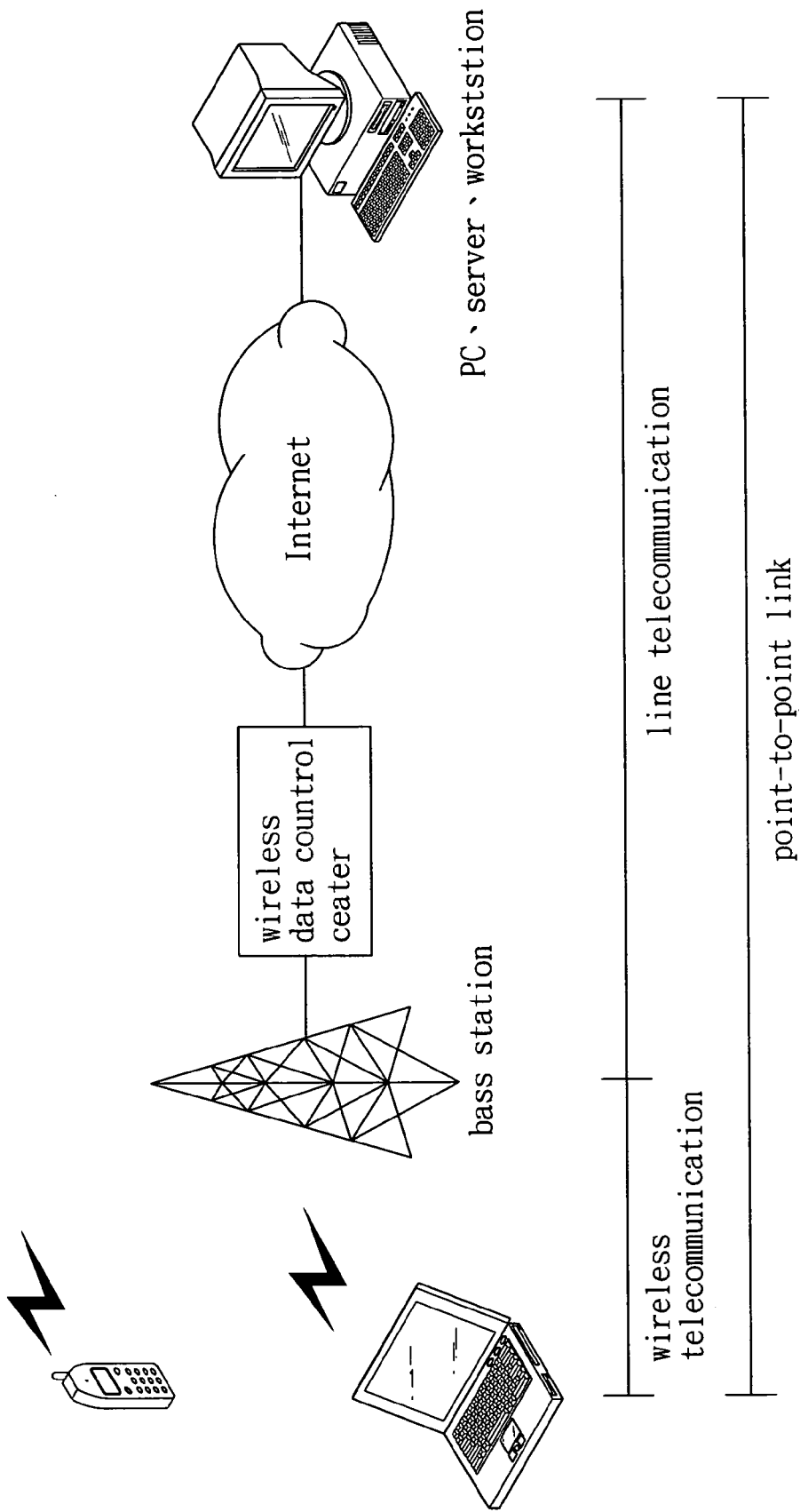
FIG. 1 is a schematic diagram showing the structure of the wireless Internet.
Figure 2:
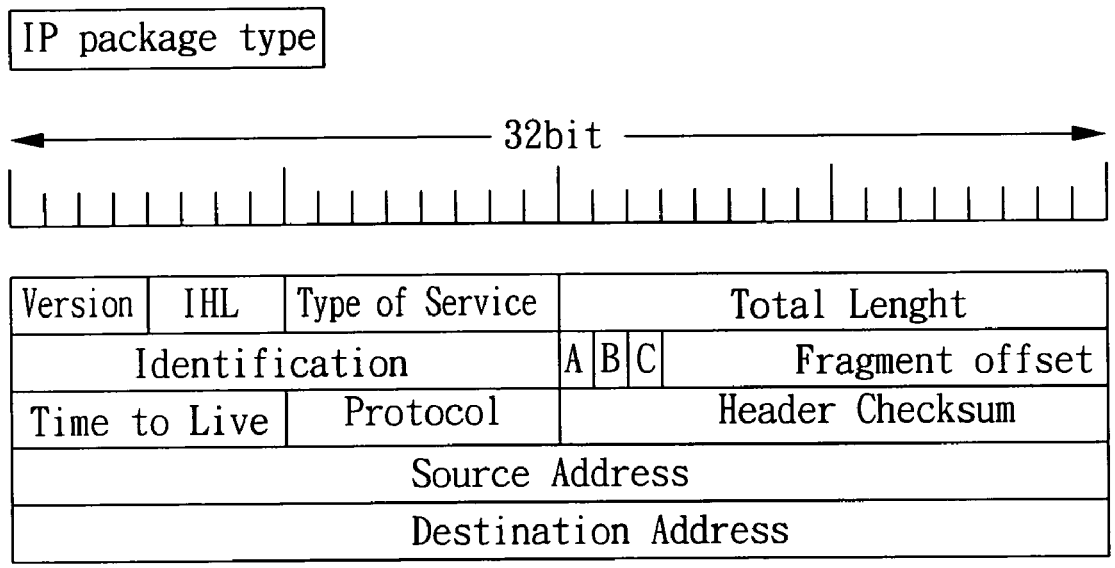
FIG. 2 is a schematic diagram showing the TCP/IP header format of prior art.
Figure 3:
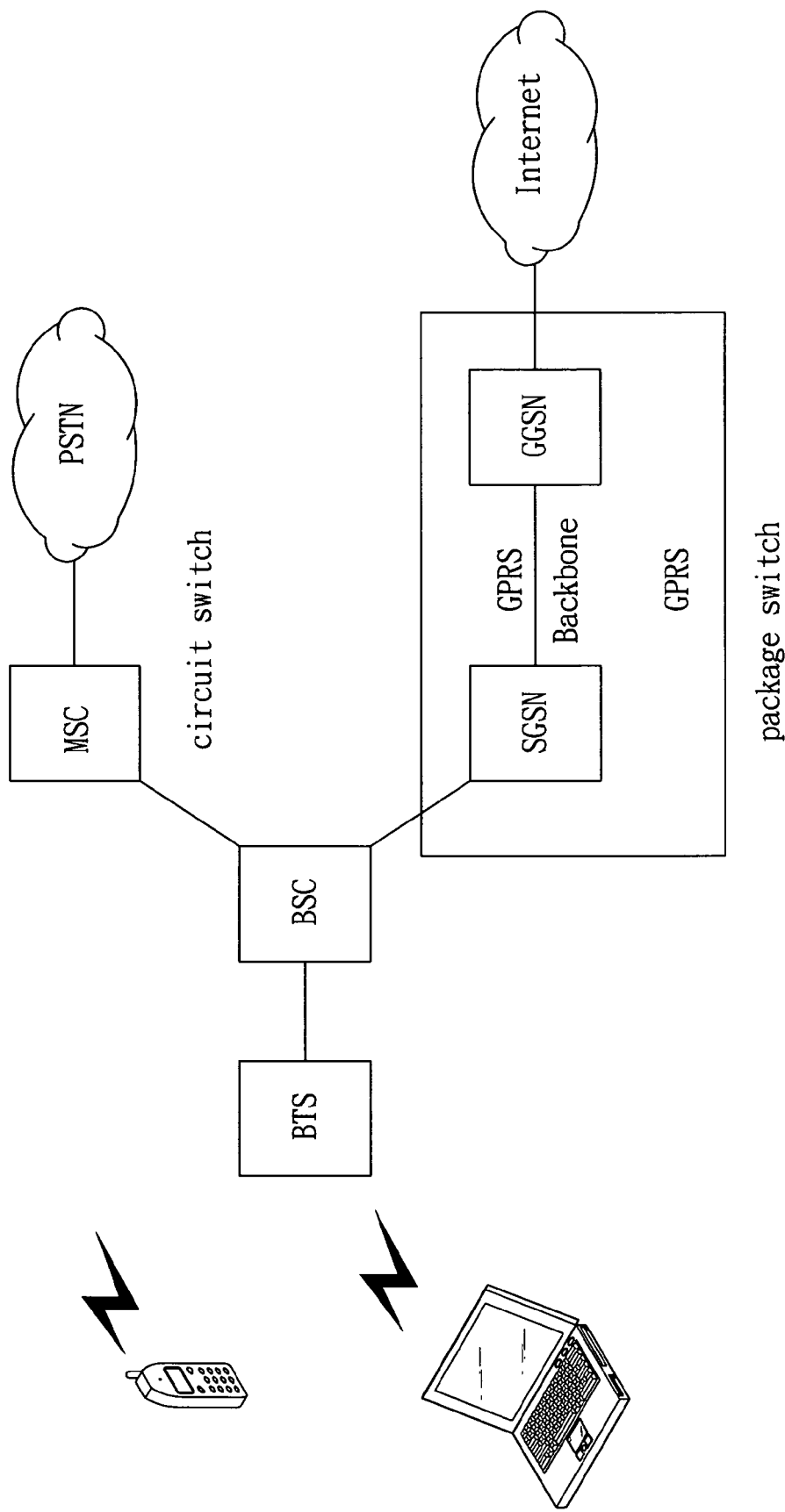
FIG. 3 is a schematic diagram showing the structure of GPRS.

The following is an embodiment of the present invention applied in GPRS. The full name of GPRS is General Packet Radio Service, which is the most common data transmission service in the present wireless network. GPRS, so-called the 2.5th generation mobile telephone system, is an improvement on the 2nd generation mobile telephone system, Global System for Mobile communication (GSM). Please refer to FIG. 3, which shows the structure of the GPRS. In the GPRS Base Station System (BSS), the signals transmitted from users are received by the Base Transceiver Station (3TS), and then transmitted to the Base Station Controller (BSC). Meanwhile, the BSC will send the audio signals into the Public Switch Telephone Network (PSTN) through the circuit switch by using Mobile Switching Center (MSC), or send the data signals into the Internet through Serving GPRS Support Node (SGSN) and Gateway GPRS Support Node (GGSN). Wherein the major function of SGSN is to recognize the legal users of GPRS, to record the used BTS, to grant equipments of users a dynamic IP address, to receive the data from GGSN so as to package them, and then to transmit these packages to the wireless terminal of users through the BSC and BTS. Moreover, between the SGSN and the GGSN is the interior transmission backbone network of GPRS.

Figure 4:
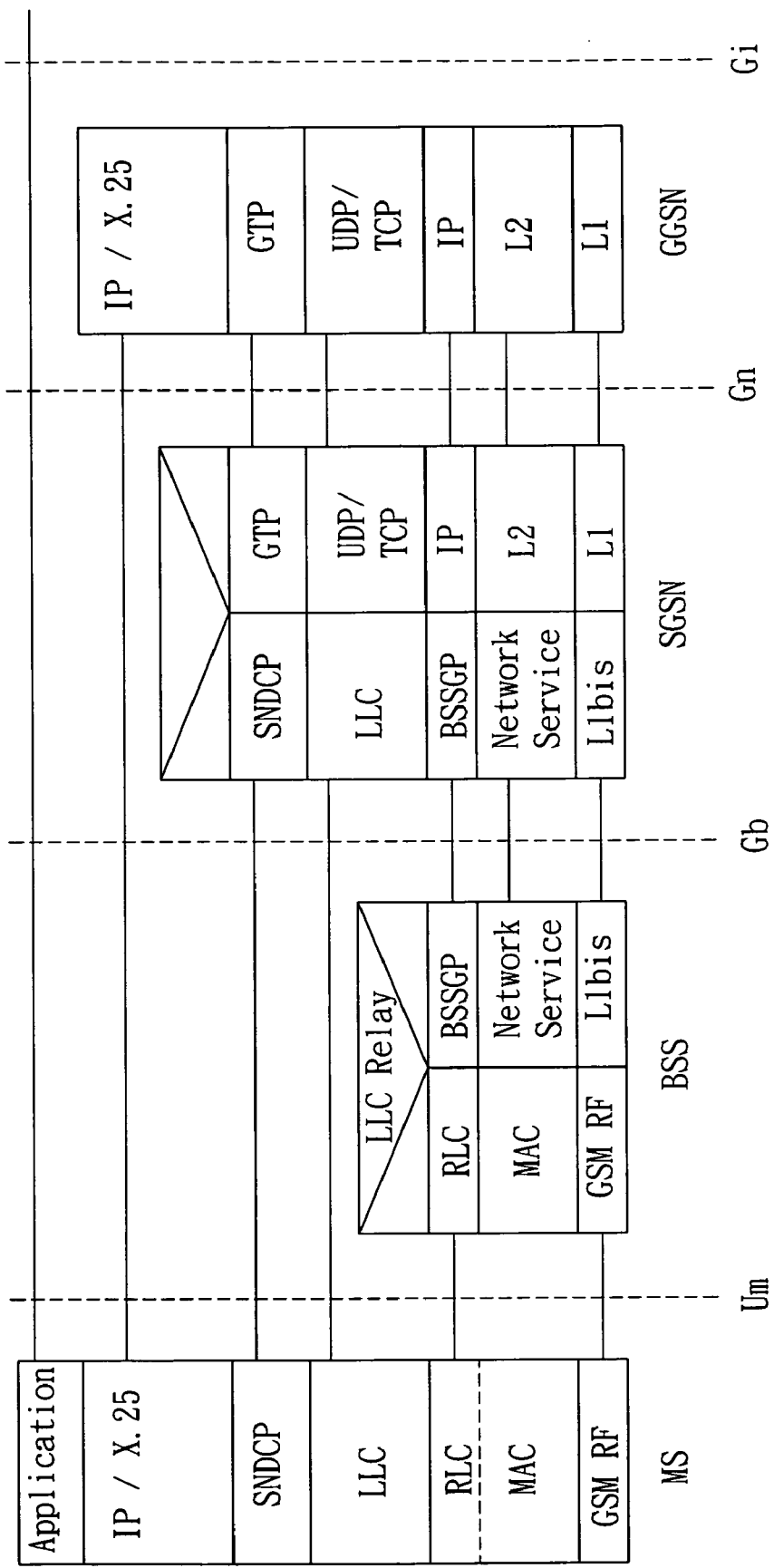
FIG. 4 is a schematic diagram showing the GPRS data transmission platform.

Please refer to FIG. 4, which is a structure diagram showing the GPRS data transmission platform. In the side of mobile station, from bottom to top, it can be divided into the substantial layer, the Radio Link Control (RLC)/Medium Access Control (MAC) layer, the Logical Link Control (LLC) layer, the Subnetwork Dependent Convergence Protocol (SNDCP) layer, and the network layer.

The RLC/MAC layer is used to make the topper layer services be transmitted successfully through the substantial layer of the GPRS air interface. It defines the transmission rule making several different mobile phones can share the same transmission interface in the same time. Wherein, the RLC layer is used chiefly to manage the process of data transmitting through the air interface and the procedure of data correction; the method of the aforesaid data correction is selective ARQ (Auto Repeat reQuest). And the MAC layer is used chiefly to make lots of users be able to share the channels by adopting the slotted ALOHA based reservation protocol. It manages the wireless resources that many mobile phones attempt to access, and decides the distribution rule of wireless resources at the network terminal. In addition, if too many mobile phones send the requests for accessing the wireless channel in a certain period, the limited resources will result in the problem of collision, and one of the major works of the MAC layer is to solve such problem. Besides, the MAC is also used to decide providing which services to which users from the various service demands. The LLC (Logical Link Control) layer is used to provide an encryption logic connection with high reliability between the MS (Mobile Station) and the SGSN. Moreover, on the SNDCP data unit of the SNDCP layer, LLC can generate the LCC address and the frame field so as to form an integrated LLC frame. Furthermore, LLC can realize the repeated transmitting control of one-to-many fixed address and data frame. The SNDCP layer is located between the GPRS serving support node and the base station and is used for the major communication of the upper layer. Based on the different demands of the lower layer, SNDCP can divide the Protocol Data Unit (PDU) of the network layer into one or several LLC frames so as to achieve the object of protocol exchange. In addition, SNDCP is also in charge of the user data multiplexing and compressing, the TCP/IP header converting, and the transmission method deciding based on the service quality of users.

As the foregoing, the spirit of the present invention is to compress some fields such as (1) the Version field of IP header, the IHL field of IP header, the Source Port field of TCP header, and the TCP Header Length field by using RFC 1144 header compression rule; (2) the Sequence Number field of TCP header and the Acknowledgment Number field of TCP header by using the character that wireless telecommunication is the single-hop connection; and (3) the existed information in the connecting between the mobile station and the base station such as the Header Checksum field of IP header and the Checksum field of TCP header; thus the unnecessary portions can be eliminated to increase the efficient transmission rate.

Figure 5:
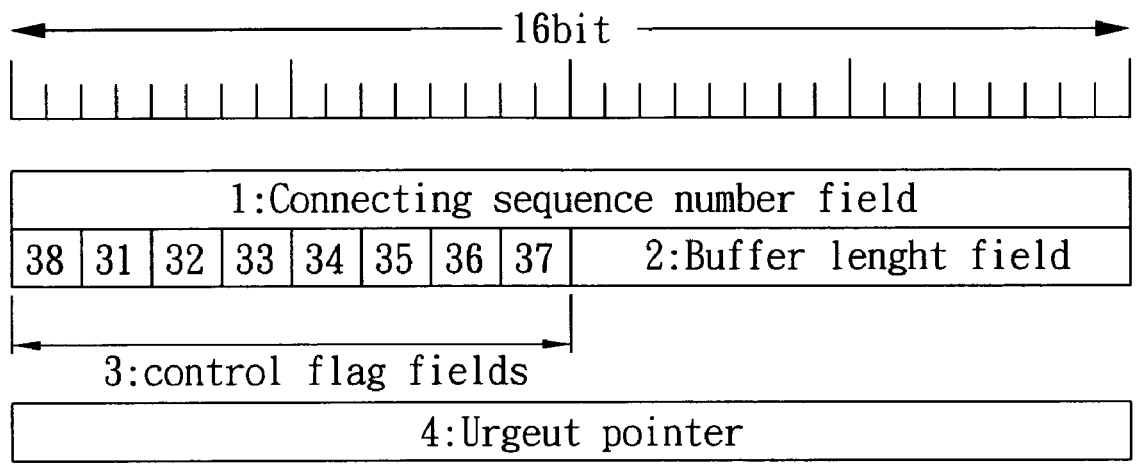
FIG. 5 is a schematic diagram showing the embodiment of the present invention.

Please refer to FIG. 5, which is an embodiment of the present invention under the GPRS acknowledge mode. In this embodiment, the compression header format of the present invention is of 32 bits, and each package header comprises:

a connecting sequence number field 1, using 16 bits to store a connecting sequence number so as to indicate the required TCP/IP header information of the related base stations; wherein the connecting sequence numbers of TCP/IP connection are all different for the recognition;

a buffer length field 2, using 8 bits to store a length value of buffer region so as to indicate the maximum acceptable package number of the buffer region in receiver. In the original TCP/IP format, the buffer length field needs 16 bits to store the absolute number of transmissive packages because of the inconsistent package arrival sequence; however, in the present embodiment, the character of single-hop connection in wireless telecommunication makes the arrival sequence fixed, and thus the difference of buffer length between one package to the next one is very minor; therefore, by adopting the new header format to store such the difference of buffer length, we can shorten the space of the buffer length field to be only 8 bits; and a plurality of control flag fields 3, using 8 bits to provide the necessary control information to control the transmission. Wherein, the plurality of control flag fields 3 comprises a last flag field 31 with 1 bit for indicating whether the received packet is the last one; an Urgent Flag field (URG) 32 with 1 bit for indicating whether the packet is the urgent packet, and if the packet is a urgent packet, the header will generate an extra urgent pointer field 4 with 16 bits; an Acknowledgment Flag field (ACK) 33 with 1 bit for indicating whether the packet asks the response form the receiver; a Push Flag field (PSH) 34 with 1 bit for indicating whether the packet pushes the receiver to send the data to application programs; a Reset Connection Flag field (RST) 35 with 1 bit for indicating whether the packet needs to be resent; a Synchronize Flag field (SYN) 36 with 1 bit for indicating whether the packet needs to carry out the synchronous communication; a Finish Flag field (FIN) 37 with 1 bit for indicating whether the transmission is over; and a Reserved field 38 for the reserve of function extension. Generally, to make the length of the plurality of control flag fields 3 be a multiple of byte, the length of the reserved field 38 is often used to fill the byte to full. For example, in the present embodiment, the aforesaid seven control flag fields have occupied 7 bits, so to complete a full byte (8 bits), the Reserved field 38 needs to occupy 1 bit.

The following is the detail analysis of the present invention. Firstly, in the same TCP/IP connection, lots of TCP/IP information will not change during the TCP/IP lifetime. That is, it can be imagined that the base station will possess some required data after the action of initiation, storing such TCP/IP information into database labeled x and sending the mobile station the number of label x, which is the exact connecting sequence number. Therefore, in the data transmission of mobile station, if the mobile unit sending a packet with x, the base station will begin to search the related information in the database labeled x, rather than to ask the mobile station to resend. The base station and the mobile unit communicate packets with number x during the lifetime of the TCP/IP connection. The mobile unit transmits a packet with x to the base station. The base station will combine the packet and the TCP/IP information storing in the database to make another packet for internet connection. For the distinguish ability of all connections, each connecting sequence number of TCP/IP connection, needs to be unique. Besides, the foregoing required data comprises the Version field of IP header, the IHL field of IP header, the Type of Service field, the Time to Live field, the Protocol field, the Source Address field, the Destination Address field, the Destination Port field as well as the Source Port field of TCP header, the TCP header length field, and the Reserved field. Wherein the more important fields are the Source Address field, the Destination Address field, the Destination Port field, and the Source Port field. Except the Source Address field that is acquired from the Network Service Access Point Identifier (NSAPI) of SNDCP layer, the Destination Address field, the Destination Port field, and the Source Port field are acquired from the data carried by the connecting sequence number field. Commonly, the base station as well as the mobile station will record the connecting sequence number respectively so as to facilitate the communication between the base station and the mobile station.

Next, based on the character of executing wireless communication under the acknowledge mode and of single-hop in wireless telecommunication, the information such as the Sequence Number field of TCP header, the Acknowledgment Number field, and the Fragment Offset field can be found in the SNDCP and the LLC layer. Therefore, the information such as the Sequence Number field of TCP header, the Acknowledgment Number field, and the Fragment Offset field can be eliminated. Moreover, the Header Checksum field of IP header and the Checksum field of TCP field can be replaced by the Frame Check Sequence field in the LLC layer.

The format shown in FIG. 5 coordinated with the stored data in base stations thereby can be carried out certainly.

Under the ideal situation, the compression header format of the present invention only uses 4 bytes, compared with the 40 bytes of the traditional TCP/IP header, being able to economize about 90% of the space. Even for the rare urgent package, the present embodiment also uses mere 6 bytes (the urgent pointer 4 occupies 2 bytes). During the TCP/IP connecting, the compression header format can be carried out in most time so as to save large unnecessary transmitting space and improve the efficient data transmission rate. Certainly, such the compression header format can be utilized not only in the GPRS but also in the third generation mobile system (3G).

In summary, from the structural characteristics and detailed disclosure of each embodiment according to the invention, it sufficiently shows that the invention has progressiveness of deep implementation in both objective and function, also has the application value in industry, and it is an application never seen ever in current market and, according to the spirit of patent law, the invention is completely fulfilled the essential requirement of new typed patent.

What is claimed is:

1. A communication system using a compression Transmission Control Protocol/Internet Protocol (TCP/IP) header format as a label in package transmitting, comprising:
   a base station;
   a mobile unit connecting to said base station with a TCP/IP connection using said compression TCP/IP header format; and
   wherein said compression TCP/IP header format comprising:
      a connecting sequence number field for storing a connecting sequence number, said connecting sequence number corresponding to said TCP/IP connection and being unique during said TCP/IP connection's lifetime;
      a buffer length field for storing a length value of buffer region to indicate an acceptable packet number of said base station or said mobile unit; and
      a plurality of control flag fields for providing certain necessary control information for said TCP/IP connection.

2. The header format as recited in claim 1, wherein the connecting sequence number corresponds to at least one of a destination address field, a destination port field, and a source port field.

3. The header format as recited in claim 1, the plurality of control flag fields further comprising:
   a last flag field for indicating whether the package is the last one;
   an urgent flag field for indicating whether the package is urgent;
   an acknowledgment flag field for indicating whether the packet asking for an acknowledgment;
   a push function field (PSH) for indicating whether the package pushes said base station or said mobile unit to send the packet to an application program;
   a reset for the connection flag field (RST) for indicating whether the packet need to be resent;
   a synchronized flag field (SYN) for indicating whether the packet needs to carry out a synchronous communication;
   a finish flag field (FIN) for indicating whether the transmission ends; and
   a reserved field for a reserve of function extension.

4. The TCP/IP header format as recited in claim 3, wherein the header further comprising an urgent pointer field to indicate an urgent data's location if the packet is urgent.

5. The TCP/IP header format as recited in claim 4, wherein the urgent pointer field is 16 bits.

6. The header format as recited in claim 1, is 32 bits, wherein said plurality of control flag field is 8 bits, said connecting sequence number field is 16 bits, and said buffer length field is 8 bits.

7. The header format as recited in claim 1, wherein the buffer length field stores buffer length difference between a present packet and a preceding packet.

8. The communication system as recited in claim 1 is a General Packet Radio Service (GPRS).

9. The communication system as recited in claim 1 is a third generation (3G) mobile system.

10. A method for Transmission Control Protocol/Internet Protocol (TCP/IP) header compression, the method using for a packet transmission between a base station and a mobile unit, the method comprising:
    making a TCP/IP connection of said base station and said mobile unit;
    setting a connecting sequence number corresponding to said TCP/IP connection;
    sending said connecting sequence number to said mobile unit;
    storing said connecting sequence number;
    storing a part of said TCP/IP connection's information;
    exchanging a plurality of packets between said base station and said mobile unit, each packet having said unique connecting sequence number during a lifetime of said TCP/IP connection.

11. The method of claim 10, said part of said TCP/IP connection's information comprising a destination address, a destination port, and a source port.

12. The method of claim 10, said part of said TCP/IP connection's information remaining unchanged during said TCP/IP connection's lifetime.

13. The method of claim 10, further comprising:
    said mobile unit transmitting a first packet, said first packet having said connecting sequence number;
    said base station receiving said first packet, and using said part of said TCP/IP connection's information in said first packet to execute subsequent received packets.

14. A communication system using a compression Transmission Control Protocol/Internet Protocol (TCP/IP) header format as a label in package transmitting, comprising:
    a base station;
    a mobile unit connecting to said base station with a TCP/IP connection using said compression TCP/IP header format; and
    wherein said compression TCP/IP header format comprising:
       a connecting sequence number field for storing a connecting sequence number, said connecting sequence number corresponding to said TCP/IP connection and being unique during said TCP/IP connection's lifetime;
       a buffer length field for storing a length value of buffer region to indicate an acceptable packet number of said base station or said mobile unit, and said buffer length field is used to store the buffer length difference between the present package and the preceding package; and
       a plurality of control flag fields for providing certain necessary control information for said TCP/IP connection.

* * * * *